BORK CAPRON, OF LEE CENTRE, NEW YORK.

*Letters Patent No. 84,856, dated December 15, 1868.*

IMPROVED ROOFING-COMPOSITION.

The Schedule referred to in these Letters Patent and making part of the same.

*To all whom it may concern:*

Be it known that I, BORK CAPRON, of Lee Centre, in the county of Oneida, in the State of New York, farmer, have invented a new and improved Composition of Matter for Covering Roofs of Buildings; and I do hereby declare that the following is a full and exact description of the mode of preparing, compounding, and using the same.

The nature of my invention consists in the combination of certain ingredients to form a composition, to be applied while hot to the roofs of buildings, as a weather-covering, and which, when thoroughly set and dried, is not affected by atmospheric changes.

To enable others skilled in the art to make and use my invention, I will proceed to describe its composition, mode of preparation, compounding, and application.

The Composition.

To each and every forty gallons of coal-tar, use ten pounds of asphaltum, twenty pounds of plaster of Paris, five pounds of sugar of lead, two gallons of japan varnish, four pounds of raw India rubber, four pounds of gum-shellac, twenty pounds of soapstone, two gallons of boiled linseed-oil, two gallons of spirits of turpentine, and two gallons of alcohol, or greater or less proportion thereof, or their several equivalents or derivatives.

To Prepare the Ingredients.

Dissolve or cut the India rubber, by immersing it a sufficient time in a part or whole of the turpentine. Mix about equal parts of asphaltum and turpentine, until the asphaltum becomes liquefied; or grind or break the asphaltum more or less fine, and melt it by heat in a cauldron with the coal-tar. Reduce the gum-shellac by admixture with alcohol until dissolved.

To Compound the Ingredients.

To the asphaltum and coal-tar combined, add the dissolved India rubber, then the reduced gum-shellac, then the sugar of lead, then the japan varnish, and afterwards the other specified ingredients, separately or combined. Boil the whole compound thirty minutes, more or less, keeping it well stirred.

To Use the Compound.

Apply it, while hot, with a brush, as a coating to the external surface of the roof, or over the joints where leakage may be expected.

It is applicable to a roof constructed or covered with any description of material. Applied to a metal roof, the composition prevents corrosion and leakage at the seams.

To felt-cloth or paper-covered roofs it may be applied without sand or gravel, and as a covering for shingled or wooden roofs, it prevents decay, keeps the interstices water-tight, and is a protection against fire.

What I claim as my invention, and desire to secure by Letters Patent, is—

A composition for coating the external surfaces of roofs of buildings, made by compounding coal-tar, asphaltum, plaster of Paris, sugar of lead, japan varnish, raw India rubber, gum-shellac, soapstone, boiled linseed-oil, spirits of turpentine, and alcohol, or other substances substantially the same, and boiling the mixture as herein described, in greater or less proportions, partially or wholly in combination, and with or without the addition of any other substance, as set forth.

BORK CAPRON.

Witnesses:
HENRY GRIST,
W. D. ROSS.